United States Patent [19]

Cornil

[11] Patent Number: 5,240,034
[45] Date of Patent: Aug. 31, 1993

[54] SAFETY AND AUTOMATIC STOP DEVICE, IN PARTICULAR FOR GAS EXPANSION STATIONS

[75] Inventor: Jean-Philippe Cornil, Houille, France

[73] Assignee: Gaz de France, Paris, France

[21] Appl. No.: 943,695

[22] Filed: Sep. 11, 1992

[30] Foreign Application Priority Data

Sep. 13, 1991 [FR] France .................. 91 11345

[51] Int. Cl.[5] .................................. F16K 17/00
[52] U.S. Cl. ........................ 137/461; 137/236.1; 137/463; 137/624.27
[58] Field of Search ............ 137/461, 463, 624.27, 137/236.1

[56] References Cited

U.S. PATENT DOCUMENTS

| | | | |
|---|---|---|---|
| 2,498,483 | 2/1950 | Campbell . | |
| 2,676,611 | 4/1954 | Page | 137/461 |
| 2,898,936 | 8/1959 | Collins | 137/625.27 X |
| 3,115,330 | 12/1963 | Dollison | 137/624.27 X |
| 3,389,718 | 6/1968 | Johnson et al. . | |
| 3,424,194 | 1/1969 | Kruzan et al. | 137/463 X |
| 3,750,694 | 8/1973 | Fawkes | 137/236.1 |
| 4,026,326 | 5/1977 | Wells et al. | 137/624.27 X |

Primary Examiner—Stephen M. Hepperle
Attorney, Agent, or Firm—Bacon & Thomas

[57] ABSTRACT

A safety and automatic stop device for interrupting the flow of gaseous fluid along a main duct by tripping a safety valve member including a closing actuator for closing the safety valve member and an opening actuator for opening the safety valve member. A closing control module cooperates with a pressure-measuring housing to deliver an on/off pneumatic signal to the closing actuator as a function of the value of the pressure of a gaseous fluid to be controlled relative to at least one reference pressure determined by the pressure-measuring housing. A manual control element is used to apply an on/off pneumatic signal of predetermined value to the opening actuator and for selectively resetting the safety valve member. The safety and automatic stop device of the present invention is particularly adapted for application to a buried gas expansion station.

14 Claims, 4 Drawing Sheets

SAFETY AND AUTOMATIC STOP DEVICE, IN PARTICULAR FOR GAS EXPANSION STATIONS

The present invention relates to a safety ad automatic stop device usable mainly in the field of public or private transport and distribution of gaseous fluids, and intended in particular for stations in which gas is expanded.

BACKGROUND OF THE INVENTION

In a gas distribution network, it is sometimes necessary to interrupt the flow of fluid when, due to some anomaly, the pressure in the network is on longer in compliance with the expected pressure and lies on the wrong side of a predetermined reference value. The reference value may correspond either to a maximum pressure or to a minimum pressure.

This safety and automatic stop function is performed by a member that is commonly called a "safety valve".

FIG. 4 shows a prior art embodiment of a safety valve installed on a pressure regulator.

The function of a pressure regulator is to adjust the pressure of the fluid passing through it. This adjustment is performed either as a function of the pressure of said fluid as measured downstream from the regulator, in which case it is called a "pressure-reducing valve", or as measured upstream from the regulator, in which case it is called a "release valve", or else as a function of a pressure measured in another fluid. When greater accuracy is desired in the adjustment, a second member called a "pilot valve" is associated with said first regulator, and is constituted by a pressure-reducing valve that deals specifically with the pressure control signal for the actuator of the regulator. The assembly is then called a "pressure-reducing regulator".

As shown in FIG. 4, a regulator assembly fitted with a safety valve mainly comprises three portions: a central portion 1 which constituted both the body of the regulator and the body of the safety valve; a top portion 2 which constitutes the actuator of the regulator; and a bottom portion 3 which comprises the control means for the safety valve per se.

The assembly also includes pressure-reducing valves 4 and 5, throttling cocks 6 and 7, and a pressure-measuring device 3 enabling the pressure to be adjusted in a main duct 9 having the safety valve installed therein by means of upstream and downstream connection flange 10 and 11 respectively on the body 1. In conventional manner, the body includes a central orifice 15 disposed perpendicularly to the flow of the gas flowing along the duct 9, with the top end 16 of the orifice constituting the set of the regulator valve and with the bottom end 17 of the orifice constituting the seat of the safety valve.

The actuator 2 of the regulator valve is provided with a diaphragm 20 which is displaced under the effect of opposing forces exerted by a spring 21 counteracting the pressure taken downstream from the regulator and safety valve assembly, thereby vertically displacing the valve member 22 of the regulator valve by means of a push rod 23.

The portion 3 for controlling the safety valve essentially comprises a mechanism housing 30 and a pressure-measuring housing 31. The mechanism housing includes a detection stage 32 and a power stage 34 which acts on a control rod 35 having the valve member 36 of the safety valve fixed to the end thereof. This two-stage mechanism guarantees the accuracy with which the shutter 36 is tripped under the control of the pressure-measuring housing 31 responding to a pressure threshold determined by the setting of a spring 37. An incorporated lever 38 enables the trip mechanism to be reset after it has tripped.

In another example of the prior art (not shown), the mechanism may be tripped manually by a pushbutton, for example, and the pressure of the circuit to be controlled may also be adjusted by means of maximum and minimum pressure springs set to prefixed values.

Although those devices perform the function for which they are designed properly, they nevertheless suffer from numerous drawbacks.

Firstly, the device for locking the safety valve is often complex and fragile because of the numerous levers included in its mechanism housing for the purpose of multiplying the force generated by the valve spring, thereby limiting reliability in particular, and consequently reducing the level of safety that can be expected from such a device. In addition, this fragility of the mechanism requires its various levers to be adjusted minutely, and any clumsy handling quickly leads to breakage, which happens frequently when the device is put back into operation manually, in particular because of the forces exerted by the manual resetting lever. Likewise, the condensation associated with the expansion of the gas gives rise to a high degree of oxidation of these various mechanisms, and sometimes also causes them to be jammed by the formation of ice. Finally, these various operations require an operator to act directly on the device which makes it impossible for such a device to be used in buried expansion stations, for example.

An object of the present invention is to remedy the above-mentioned drawbacks and to provide a safety and automatic stop device which is also usable in buried expansion stations and whose overall reliability is greater than that of previously-existing devices.

SUMMARY OF THE INVENTION

These objects are achieved by a safety and automatic stop device for interrupting the flow of gaseous fluid along a main duct by tripping a safety valve member, the device comprising a safety valve comprising a closing actuator for closing the safety valve member and an opening actuator for opening the safety valve member, and an independent device for remotely controlling said safety valve, comprising both a closing control module co-operating with a pressure-measuring housing to deliver an on/off pneumatic signal to the closing actuator as a function of the value of the pressure of a gaseous fluid to be controlled relative to at least one reference pressure determined by the pressure-measuring housing, and manual control means for applying an on/off pneumatic signal of predetermined value to the opening actuator and for selectively resetting the safety valve member.

The remote control device may comprise a pressure regulator for enabling an on/off pneumatic signal to be delivered whose high and low level values are predetermined.

In a particular embodiment, the closing control module includes a control rod connected to the pressure-measuring housing and provided with at least one ramp which co-operates with a cam secured to a rod of a closing control valve member for transforming transaction motion of the control rod that moves as a function of variations in the value of the pressure of the gaseous fluid into motion of the rod of the valve member, thereby causing an on/off pneumatic signal to be delivered to the closing actuator for closing the safety valve member as a function of the value of the pressure of the gaseous fluid to be controlled relative to said predetermined reference value.

Advantageously, in that case, said control rod connected to the pressure-measuring housing is provided with two adjustable ramps co-operating with the cam secured to the rod of the valve member to cause an on/off pneumatic signal to be delivered to the closing actuator for closing the safety valve member as a function of the value of the pressure of the gaseous fluid to be controlled relative both to a minimum and to a maximum reference pressure value as determined by the pressure-measuring housing.

By way of example, the pressure-measuring housing includes a diaphragm secured to the control rod and whose displacement depends both on the pressure of the gaseous fluid to be controlled and on opposing forces generated by at least one setting spring defining a reference pressure value.

More particularly, the pressure-measuring housing comprises a first setting spring defining a maximum reference pressure value and a second setting spring defining a minimum reference pressure value.

Advantageously, the pressure regulator is integrated in the body of the independent device for remotely controlling the safety valve.

The pressure regulator may take a pressure from said main duct upstream from the safety valve and serve to deliver a pneumatic signal whose high level is maintained at a constant value that is considerably less than said taken pressure.

In the invention, action on the manual resetting control knob causes a resetting control valve member to be opened and a high level on/off pneumatic signal to be delivered to the opening actuator of the safety valve member.

The control rod preferably includes a knurled knob at its free end to enable the safety valve member to be closed under manual control.

The safety valve may include a push rod having one end that acts on the safety valve member and an opposite end carrying an abutment that co-operates with the piston of the opening actuator, the push rod also including a groove provided to co-operate with a ball-locking device.

The ball-locking device is integrated in the closing actuator for closing the safety valve member and comprises an annular rod coaxial with the pus rod, secured to the body of the safety valve, and holding captive balls which are disposed in a cavity formed in the piston of the closing actuator and co-operating selectively with a groove of the push rod.

In this embodiment, after the safety valve member has previously been opened, the effect of the pneumatic signal on the closing actuator is to cause it to move along the push rod which passes therethrough, thereby releasing the balls which are then expelled from the groove under the effect of the traction exerted by a spring bearing against the valve member, so as to cause them to come into contact with the flared wall of said cavity in said piston of the closing actuator, the balls being held in the annular rod.

The pressure exerted on the piston of the closing actuator by the pneumatic signal disappears, and the piston tends to return to its initial position under the effect of a return spring.

The safety and automatic stop device of the invention is particularly adapted for application to a buried gas expansion station.

In which case, the independent remote control device for the safety valve is itself disposed in an accessible, non-buried location situated remote from the cold zone of the buried safety valve, and the independent control device is connected to the safety valve by pipework for applying said pneumatic signal to said closing actuator and to said opening actuator.

BRIEF DESCRIPTION OF THE DRAWINGS

An embodiment of the invention is described by way of example with reference to the accompanying drawings, in which.

DETAILED DESCRIPTION

Figure 1:
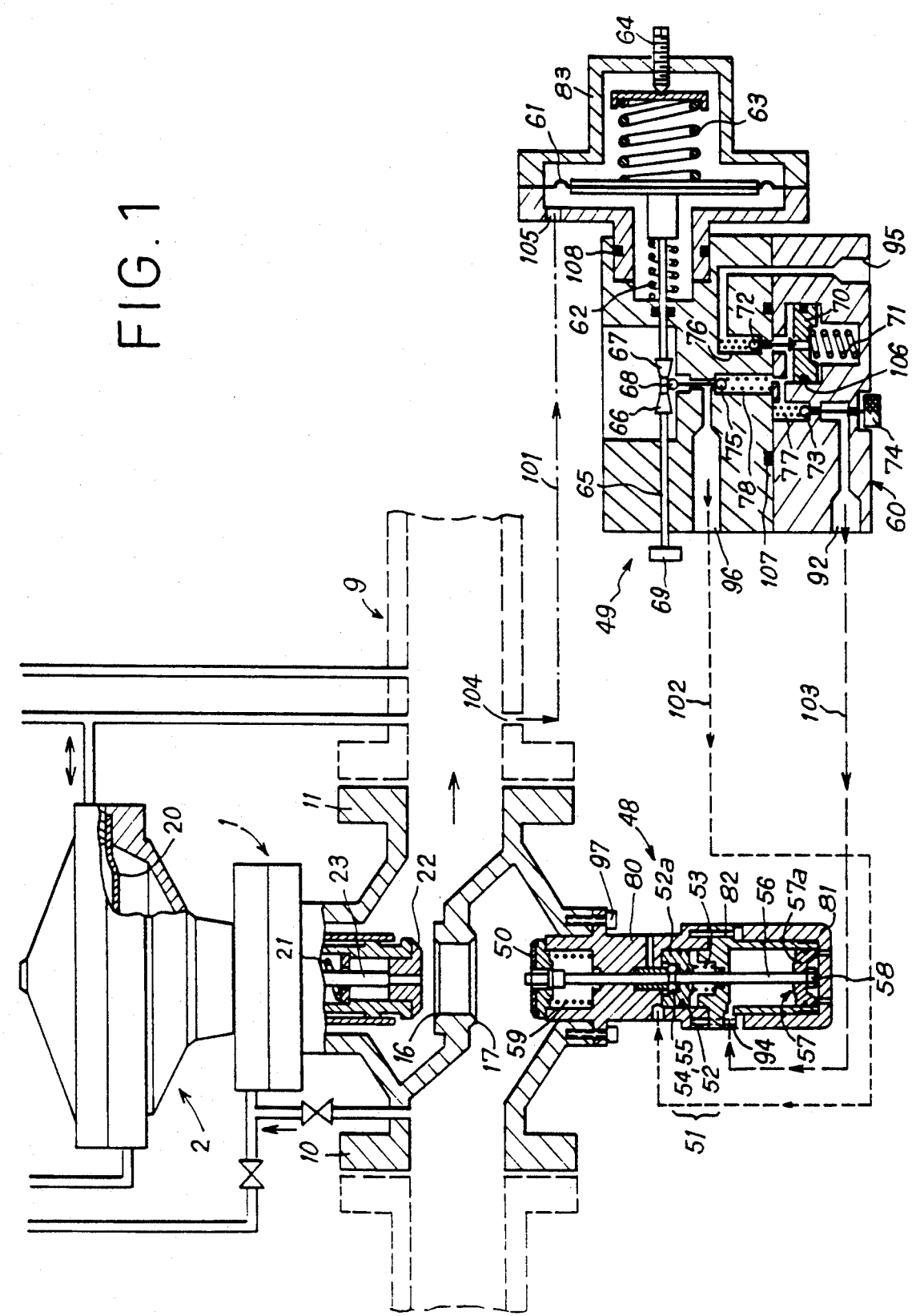
FIG. 1 is an overall diagram of a safety and automatic stop device of the invention installed on a pressure regulator, and shown in section.
Figure 4:
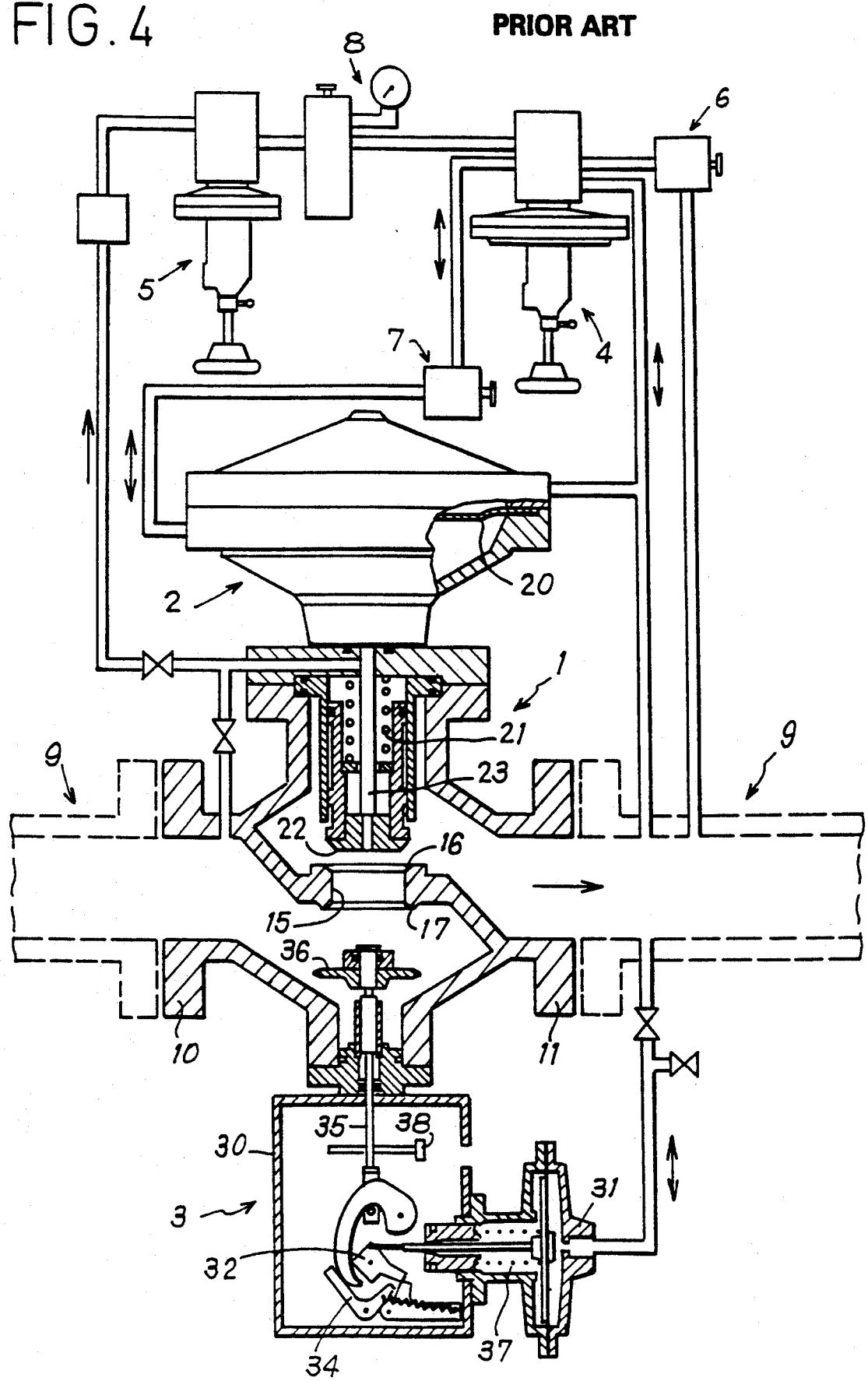
FIG. 4 shows a prior art safety valve installed on a conventional pressure regulator.

Reference is made initially to FIG. 1 which shows a safety and stop device of the invention. This device is essentially constituted by two independent and physically separate elements 48 and 49 which co-operate to selectively interrupt the flow of a gas along a main duct 9 on which a regulator may be disposed, which regulator may include a body 1 and a measuring chamber 2 that are conventional and analogous to those shown in FIG. 4.

Where appropriate, elements in FIG. 1 which are identical to elements in FIG. 4 are given the same reference numerals and are not again described in detail below.

The device of the invention is constituted by a first assembly 48 which constitutes the safety valve per se and which essentially includes a valve member 50 for co-operating with a valve seat 17 integrated in the body 1 to interrupt the flow of gas along the duct 9 when the pressure in the duct 9 downstream from the regulator lies outside predetermined reference values. Under normal circumstances, the valve member 50 is held in its open position by a ball-locking device 51 integrated in the assembly 48. This locking device 51 co-operates with a closing actuator 52 for closing the safety valve 50. The piston 52a of the closing actuator 52 is disposed coaxially on a push rod 56 and co-operates with balls 54 held in a groove 55 of said rod 56. A return spring 53 enables the piston 52a to return to its initial position in the absence of feed to the piston.

The safety valve 50 is raised by an opening actuator 57 which includes a second piston 57a also disposed coaxially on the push rod 56 and having a face perpendicular to said rod 56 co-operating with an abutment 58 placed at one of the ends of the rod, with the other end of the rod 56 being fixed to the valve member 50 which has a valve spring 59 acting thereon. This safety valve 48 is assembled as two superposed portions, a first portion 80 receiving the locking device 51 together with the closing actuator 52, and a second portion 81 receiving the opening actuator 57. The push rod 56 passes through the first portion and extends into the second, and these two portions are secured to each other by fixing means 82 and they are isolated by sealing rings, with the entire assembly being fixed to the body 1 of the regulator by coupling means 97.

The second assembly 49 constitutes a pilot valve device for remotely controlling the safety valve 48 and itself includes a closing control module 61 to 68 co-operating with a pressure-measuring housing 83 to deliver an on/off pneumatic signal to the closing actuator 52 via a line 102, with the pneumatic signal being a function of the value of the pressure of a gaseous fluid to be controlled as applied via a line 101 to the pressure-measuring housing 83, and relative to at least one reference pressure defined within said pressure-measuring housing 83.

The remote control device 49 also comprises manual control means 74 for applying an on/off pneumatic signal of predetermined value to the opening actuator 57 via a line 103, for the purpose of selectively resetting the safety valve 50.

The on/off pneumatic signals applied via the lines 102 and 103 between the remote control pilot device 49 and the safety valve 48 may, for example, be constituted by respective pressure signals that are either at a low level corresponding to a zero or nearly zero pressure, or else at a high level corresponding to a pressure at a predetermined value that is constant or substantially constant, e.g. about 1 bar. The value of the high level pressure in the on/off pneumatic signals is preferably determined by a small pressure regulator 60 which is advantageously integrated in the body of the remote control device 49, but which could alternatively be external thereto.

The pressure signal applied to the inlet 95 of the pressure regulator 60 may, for example, be taken from a region of the main duct 9 situated upstream from the safety valve 45.

The pressure measuring housing 83 and the closing control module comprise a diaphragm 61 associated with two setting springs 62 and 63, with the compression of the second spring 63 being adjusted by a screw 64.

The diaphragm 61 is secured to a control rod 65 provided with rams 66 and 67 that co-operate with a cam 68 that may be constituted, for example, by a ball 68, serving to transform the longitudinal motion of the rod 65 into vertical back-and-forth motion of the ball 68 which acts on the rod of a ball valve 75 for selectively applying the outlet pressure of the small pressure regulator 60 to the outlet 96 and to the line 102.

The free end of the control rod 65 is advantageously provided with a knurled knob 69 enabling the safety valve 48 to be closed under manual control independently of the value of the pressure in the line 101.

The pressure regulator 60 includes an inlet ball valve 72 whose rod bears against a piston 70 that co-operates with a control spring 71 and that delivers a pneumatic outlet signal at constant pressure. The outlet from the pressure regulator 60 is connected to the outlet 92 and to the line 103 via a ball valve 73 that is manually controlled by the manual control knob 74 to make it possible to deliver an on/off signal to the safety valve 48 such that when the signal is at a high level, i.e. when the valve 73 is open, the device is reset, thereby opening the valve member 50 of the safety valve. The valve member 50 is closed under the action of a third ball valve 75 having a rod whose position is controlled by the displacement of the ball 68 that co-operates with the ramps 66 and 67. The ball valve 75 thus makes it possible to deliver an on/off signal to the safety valve 48 serving, when at a high level, i.e. when the ball valve 75 is open, to apply the outlet pressure from the pressure regulator 60 to the line 102. Return springs 76, 77, and 78 are associated with each of the ball valves 72, 73, and 75. Simultaneously, sealing rings 106, 107, and 108 serve to isolate the various elements constituting the control device 49 from one another.

The operation of the safety and automatic stop device of the invention is described below with reference to FIGS. 2 and 3 which show the safety and automatic stop device respectively in a position as tripped by exceeding a pressure maximum, and in a position as reset by the action of the actuator 57 for moving the valve member 50 off its seat.

Figure 2:
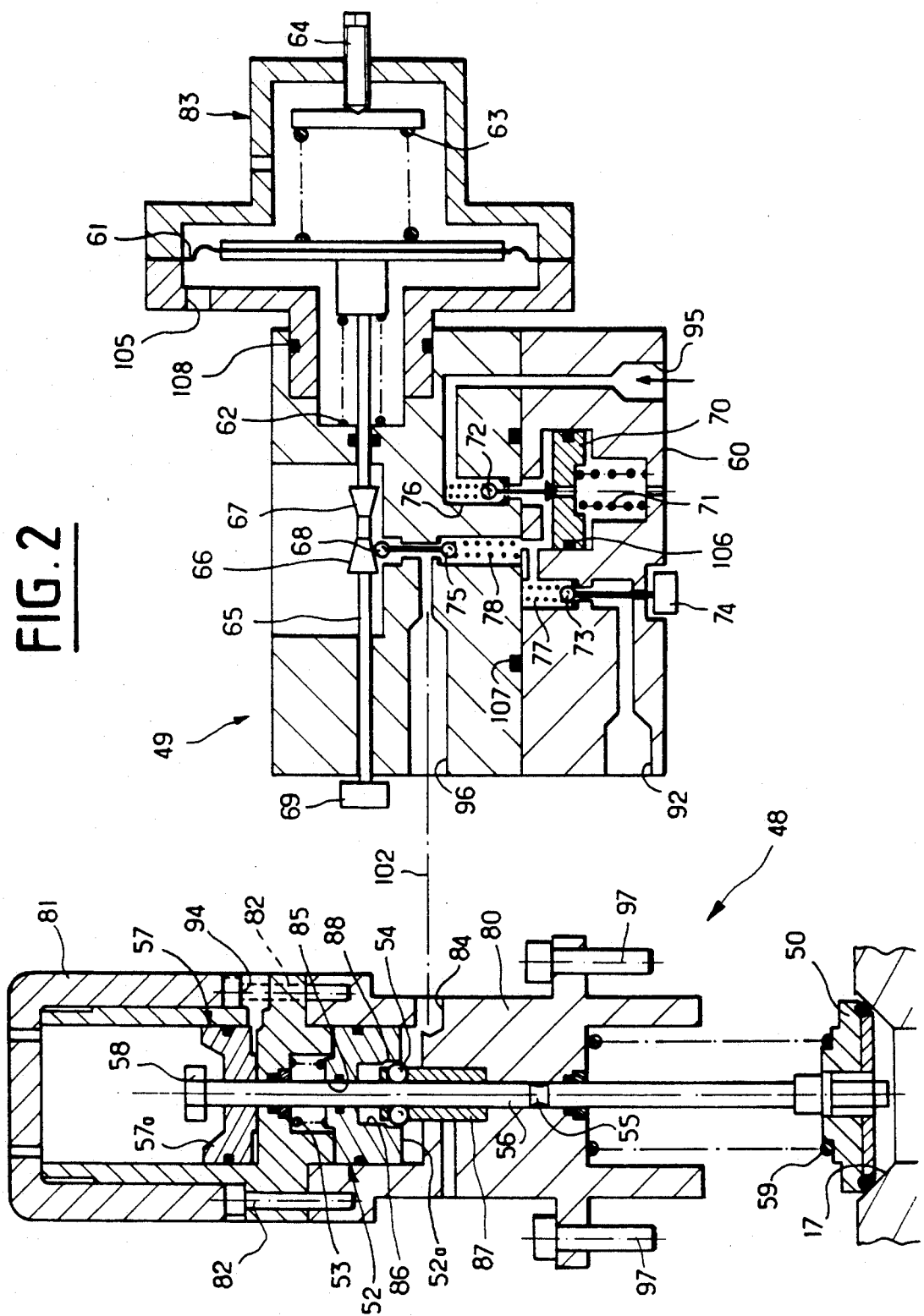
FIG. 2 is a more detailed view of an example of the device of the invention in a "safety valve open" position.

FIG. 2 shows the device in a tripped position, the valve member being closed, i.e. resting against its seat 17, with the valve opening actuator 57 being unactivated.

The pressure to be controlled as measured, for example, via a tapping point 104 downstream from the regulator and safety device assembly (see FIG. 1) is conveyed by pipework 101 to an inlet 105 of the pressure-measuring housing 83 where it acts on one of the faces of the diaphragm 61.

The diaphragm 61 also receives opposing forces from the springs 62 and 63 respectively for setting a minimum pressure and a maximum pressure at predetermined values, e.g. $4.4 \times 10^5$ Pa for the maximum and $3.5 \times 10^5$ Pa for the minimum. Nevertheless, the adjustment screw 64 makes it possible to adjust the reference value for the maximum authorized pressure, should that be necessary. Loss of equilibrium due to variations in the controlled pressures going outside the acceptable range causes the control rod 65 to move in translation and consequently causes the ball 68 to move vertically under thrust from one or other of the ramps 66 and 67 secured to the rod 65. The positions of the ramps 66 and 67 on the rod 65 are adjustable, thereby making it possible to adjust triggering on a minimum pressure. The vertical displacement of the ball 68 causes the valve member 75 to open, thereby allowing the pressure signal from the pressure regulator 60 to pass, which signal causes the valve member 50 of the safety valve 48 to close by passing through an outlet orifice 96 and along pipework 102.

Such closure is obtained as follows. The pneumatic signal reaches the safety valve 48 of the device of the invention via an inlet orifice 84 which is formed in the portion 80 of the valve and which constitutes the duct for feeding the closing actuator 52 as constituted by the piston 52a disposed coaxially on the push rod 56 which passes therethrough. The piston 52a which is advantageously cylindrical and which advantageously possesses a cylindrical opening 85 through which the push rod passes, is provided with a cavity 86 that is coaxial with the above opening, but which is greater in diameter, serving to receive an annular rod 87 secured to the portion 80 and in which the balls 54 are received. The open end of the cavity 86 is flared in shape at 88 to make it possible when the actuator 52 is put under pressure to release the balls 54 that are held in the groove 55 of the push rod 56. This putting under pressure as achieved by the arrival of the high level pneumatic signal causes the piston to move and causes the balls 54 to be expelled from the groove 55 under the effect of the traction exerted by the spring 59 engaging the valve member 50. The balls then come into contact with the flared portion of the piston while nevertheless remaining housed in the annular rod 87.

By coming into contact with the seat 17 of the safety valve, the valve member 50 closes the safety valve and interrupts the flow of gas along the main duct 9.

A return of the controlled pressure to the acceptable pressure range causes the control rod 65 to move again but in the opposite direction under drive from the return spring 78, since closure of the ball valve 75 prevents the pneumatic signal from reaching the safety valve 48. It may also be observed that the same effect may be obtained by acting on the knurled knob 69 to cause the control rod 65 to move into the acceptable pressure range. The deactivated piston 52a then tends to return to its initial position under the action of the return spring 53. Nevertheless, the return spring is incapable on its own of overcoming the traction force exerted by the spring 59 acting on the valve member, so the valve member remains in its closed position.

Figure 3:
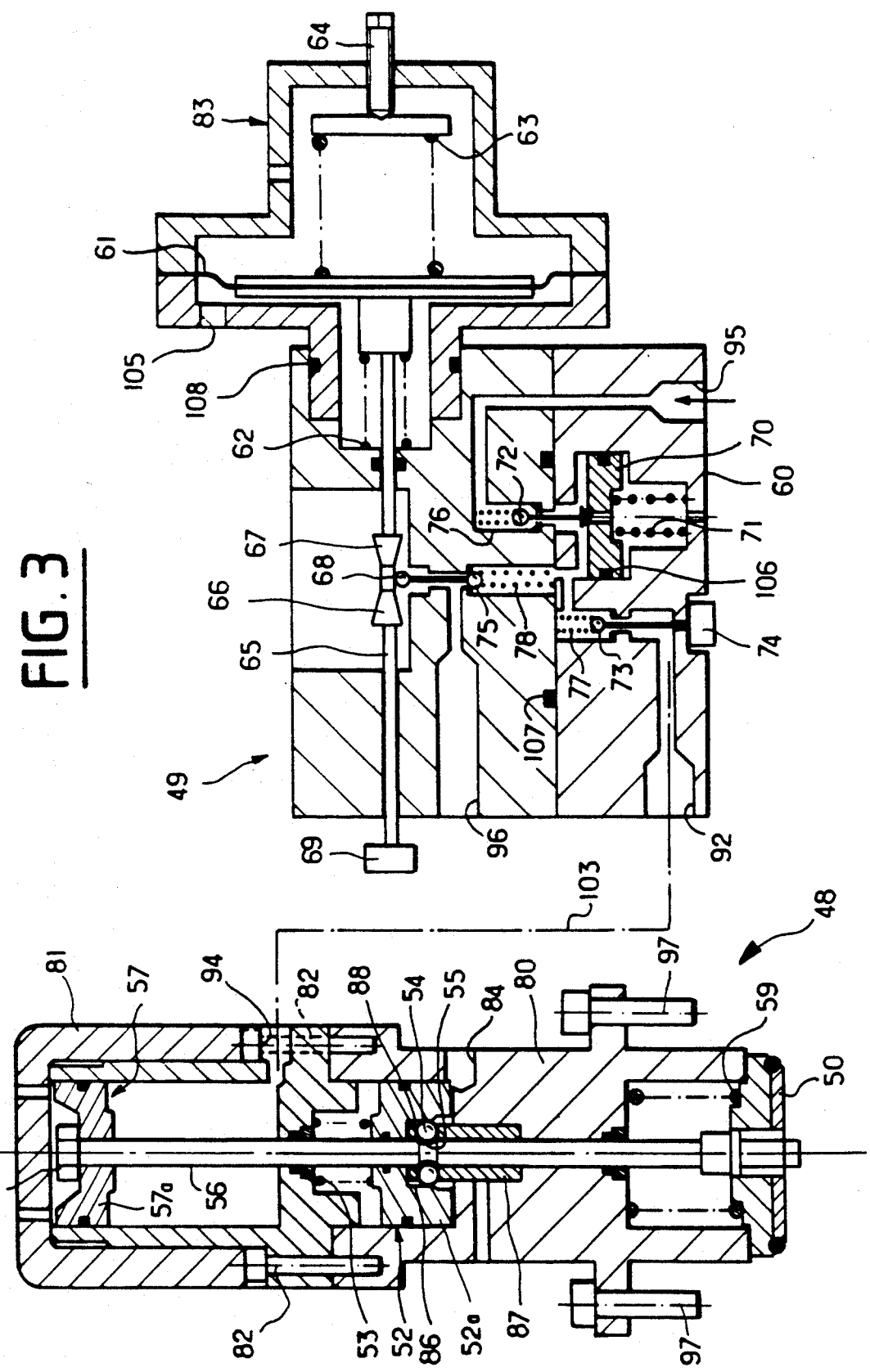
FIG. 3 shows the FIG. 2 device placed in a "safety valve closed" position.

FIG. 3 shows the position of the device of the invention after the valve member has been opened, which operation can be performed only under manual control by resetting the device using the knob 74.

Since the valve member 50 of the safety valve 48 is not automatically opened by the controlled pressure returning to the acceptable range, it is necessary to make use of an independent device to open the safety valve. This is achieved by acting on a manual control knob 74 that serves to open the ball valve 73. This causes a high level pneumatic signal to be produced analogous to that described above, since it is produced from the same pressure regulator 60. This pneumatic signal is directed via another outlet orifice 92 and pipework 103 to a second inlet orifice 94 which is formed in the portion 81 of the safety valve 48 and constitutes the feed duct of the opening actuator 57 as constituted by the piston 57a disposed coaxially on the push rod 56 which passes therethrough. Putting the piston 57a under pressure causes it to be displaced together with the push rod 56 by virtue of the abutment 58 situated at one of the ends of the rod coming into contact with a face of the piston 57a extending perpendicularly to the rod. The spring 59 engaging the valve member is compressed, and the balls 54 still held by the rod 87 return into position in the groove 55 under the action of the pressure exerted on said balls by the flared end 88 of the piston 52a under the effect of the return spring 53. The safety valve 48 is then reset and ready to be tripped again under the effect of a high level pressure signal applied to the line 102 from the remote control device 49. It should be observed that the action exerted in this way on the control knob 74 for the purpose of opening the safety valve may be performed at any moment, and thus at a moment when the controlled pressure lies outside the acceptable pressure range, i.e. lies in a range that causes the safety valve 50 to be closed. As a result, the safety valve is then opened temporarily, but the action of the return spring 53 as opposed by the piston 52a being under pressure prevents the balls 54 being received in the groove 55, so the safety valve returns to its closed position under the action of the spring 59 engaging the valve member as soon as the action on the knob 74 ceases.

Releasing the knob causes the opening actuator to be deactivated by interrupting its pressure feed since the second valve 73 closes under the action of the return spring 74, so the piston 57 returns to its initial position (see FIG. 1) providing no high level signal is applied to the line 102.

With further reference to FIG. 1, it is clear that because the two assemblies 48 and 49 are separate, the safety and automatic stop device of the invention is entirely suitable for use on buried expansion stations, for example. In addition, since the controlled element 49 is at a distance from the valve per se which is subjected both to cold and to condensation, it presents significantly increased reliability, thereby greatly improving the overall reliability of the device. In addition, it may be observed that since manual resetting of the device is now performed by an opening actuator which exerts constant traction on the push rod 57 (unlike prior art devices in which said traction depends on the highly variable force actually exerted by an operator on a manual resetting lever), the risks of said push rod being broken are greatly reduced.

Finally, unlike prior art devices, the valve member is not closed under the direct action of the pressure to be controlled, but, in the preferred embodiment as described, under the action of a constant pressure as delivered by a pressure regulator 60 integrated in the control device 49.

For example, the pressure regulator 60 may be fed by the pressure upstream from the safety valve and regulator assembly, which pressure is conveyed by pipework (not shown) to a feed orifice 95 of said regulator. The control spring 71 for the piston 70 as previously set to a determined value serves to determine the pressure value at the outlet from the regulator, e.g. at 1 bar, in a manner that is totally independent from the pressure to be controlled. Any adjustment or change of the pressure-measuring housing 83 for adapting to the flow conditions of the fluid conveyed by the duct 9 no longer requires any change to the safety valve itself, thus making it possible to standardize the safety valve.

Various modifications may be applied to the devices described above without going beyond the scope of the invention. Thus, although two ramps 66 and 67 are shown in FIGS. 1 to 3, the control device 49 need have only one ramp if the device is to be tripped only in the event of the controlled fluid pressure varying relative to a single reference pressure, which may be either a maximum acceptable value or a minimum acceptable value, depending on the intended application.

I claim:

1. A safety and automatic stop device for interrupting the flow of gaseous fluid along a main duct by tripping a safety valve member, the device comprising a safety valve comprising a closing actuator for closing the safety valve member and an opening actuator for opening the safety valve member, and an independent device for remotely controlling said safety valve, comprising both a closing control module including a control rod connected to a pressure-measuring housing and provided with at least one ramp which cooperates with a cam secured to a rod of a closing control valve member for transforming translation motion of the control rod that moves as a function of variations in the value of the pressure of the gaseous fluid into motion of the rod of the valve member, thereby causing an on/off pneumatic signal to be delivered to the closing actuator for closing the safety valve member as a function of the value of the pressure of the gaseous fluid to be controlled relative to at least one reference pressure determined by the pressure-measuring housing, and manual control means for applying an on/off pneumatic signal of predetermined value to the opening actuator and for selectively resetting the safety valve member.

2. A device according to claim 1, wherein the remote control device comprises a pressure regulator for enabling an on/off pneumatic signal to be delivered whose high and low level valves are predetermined.

3. A device according to claim 1, wherein said control rod connected to the pressure-measuring housing is provided with two adjustment ramps co-operating with the cam secured to the rod of the valve member to cause an on/off pneumatic signal to be delivered to the closing actuator for closing the safety valve member as a function of the value of the pressure of the gaseous fluid to be controlled relative both to a minimum and to a maximum reference pressure value as determined by the pressure-measuring housing.

4. A device according to claim 1, wherein the pressure-measuring housing includes a diaphragm secured to the control rod and whose displacement depends both on the pressure of the gaseous fluid to be controlled and an opposing forces generated by at least one setting spring defining a reference pressure value.

5. A device according to claim 4, wherein the pressure-measuring housing comprises a first setting spring defining a maximum reference pressure value and a second setting spring defining a minimum reference pressure value.

6. A device according to claim 2, wherein the pressure regulator takes a pressure from said main duct upstream from the safety valve and serves to deliver a pneumatic signal whose high level is maintained at a constant value that is considerably less than said taken pressure.

7. A device according to claim 1, wherein action on the manual controls means causes a resetting control valve member to be opened and a high level on/off pneumatic signal to be delivered to the opening actuator of the safety valve member.

8. A device according to claim 1, wherein the control rod includes a knurled knob at its free end to enable the safety valve member to be closed under manual control.

9. A device according to claim 1, wherein the safety valve includes a push rod having one end that acts on the safety valve member and an opposite end carrying an abutment that cooperates with the piston of the opening actuator, the push rod also including a groove provided to co-operate with a ball-locking device.

10. A device according to claim 9, wherein the ball-locking device is integrated in the closing actuator for closing the safety valve member and comprises an annular rod coaxial with the push rod, secured to the body of the safety valve, and holding captive balls which are disposed in a cavity formed in the piston of the closing actuator and co-operating selectively with a groove of the push rod.

11. A device according to claim 10, wherein the cavity includes an end that opens out with a flared shape.

12. A device according to claim 10, wherein with the safety valve member being previously opened, the effect of the pneumatic signal on the closing actuator is to cause it to move along the push rod which passes therethrough, thereby releasing the balls which are then expelled from the groove under the effect of the traction exerted by a spring bearing against the valve member, so as to cause them to come into contact with the flared wall of said cavity in said piston of the closing actuator, the balls being held in the annular rod.

13. A device according to claim 12, wherein when the pressure exerted on the piston of the closing actuator by the pneumatic signal disappears, the piston tends to return to its initial position under the effect of a return spring.

14. A device according to clam 1, applied to a buried expansion station, wherein a non-buried independent control device is connected to the safety valve by pipework for applying said pneumatic signal to said closing actuator and to said opening actuator.

* * * * *